(12) United States Patent
Holness et al.

(10) Patent No.: US 11,171,853 B2
(45) Date of Patent: Nov. 9, 2021

(54) CONSTRAINT-BASED EVENT-DRIVEN TELEMETRY

(71) Applicant: Ciena Corporation, Hanover, MD (US)

(72) Inventors: Marc Holness, Nepean (CA); Kyle Gosselin-Harris, Greenacres, WA (US); Ravi Halappa, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 52 days.

(21) Appl. No.: 16/776,934

(22) Filed: Jan. 30, 2020

(65) Prior Publication Data

US 2021/0243094 A1 Aug. 5, 2021

(51) Int. Cl.
*G06F 15/173* (2006.01)
*H04L 12/26* (2006.01)

(52) U.S. Cl.
CPC .............. *H04L 43/08* (2013.01); *H04L 43/04* (2013.01)

(58) Field of Classification Search
CPC ........................................................ H04L 43/04
See application file for complete search history.

(56) References Cited

U.S. PATENT DOCUMENTS

| | | |
|---|---|---|
| 7,590,054 B1 | 9/2009 | Holness et al. |
| 7,792,044 B2 * | 9/2010 | Holness .............. H04L 41/5009 370/242 |
| 7,924,725 B2 | 4/2011 | Mohan et al. |
| 8,018,841 B2 | 9/2011 | Holness et al. |
| 8,085,676 B2 | 12/2011 | Skalecki et al. |
| 8,149,692 B2 | 4/2012 | Holness et al. |
| 8,243,743 B2 | 8/2012 | Martin et al. |
| 8,295,157 B1 * | 10/2012 | Pimentel .............. H04Q 3/0062 370/216 |
| 8,295,175 B2 | 10/2012 | Ellis et al. |
| 8,305,938 B2 | 11/2012 | Holness et al. |
| 8,509,061 B2 | 8/2013 | Holness et al. |
| 8,588,060 B2 | 11/2013 | Holness |

(Continued)

FOREIGN PATENT DOCUMENTS

WO 2018046985 A1 3/2018

OTHER PUBLICATIONS

Sajassi et al., EVPN VPWS Flexible Cross-Connect Service draft-ietf-bess-evpn-vpws-fxc-01.txt, Internet—Draft, Standards Track, Jun. 6, 2019, pp. 1-16.

(Continued)

*Primary Examiner* — Thanh T Nguyen
(74) *Attorney, Agent, or Firm* — Clements Bernard Walker; Lawrence A. Baratta, Jr.; Christopher L. Bernard

(57) ABSTRACT

Telemetry systems and methods are provided in which data is streamed from to a remote location based on predicate affirmation of pre-established conditions of a system. In one embodiment, a network device comprises a processing device and a memory device configured to store logic instructions. When executed, the logic instructions are configured to cause the processing device to obtain a first set of one or more data elements indicative of one or more conditions of a network in which the network device operates. Also, the logic instructions are configured to cause the processing device to monitor the first set of one or more data elements to determine if a predefined predicate is affirmed and execute a response action when the predefined predicate is affirmed.

13 Claims, 7 Drawing Sheets

(56) References Cited

U.S. PATENT DOCUMENTS

| | | | |
|---|---|---|---|
| 8,625,410 B2 | 1/2014 | Abdullah et al. | |
| 8,737,198 B1 | 5/2014 | Holness et al. | |
| 8,787,147 B2 | 7/2014 | Caird et al. | |
| 8,787,398 B2 | 7/2014 | Holness et al. | |
| 8,797,845 B2 | 8/2014 | Ryoo et al. | |
| 8,855,122 B2 | 10/2014 | Bottorff | |
| 9,025,435 B2 * | 5/2015 | Holness | H04L 12/437 370/216 |
| 9,036,641 B2 * | 5/2015 | Allan | H04L 49/604 370/392 |
| 9,075,717 B2 | 7/2015 | Mohan, Jr. et al. | |
| 9,197,493 B2 * | 11/2015 | Holness | H04L 69/40 |
| 9,203,549 B2 * | 12/2015 | Holness | H04L 1/00 |
| 9,203,644 B2 | 12/2015 | Holness et al. | |
| 9,203,746 B2 | 12/2015 | Gilson et al. | |
| 9,264,328 B2 | 2/2016 | Hu et al. | |
| 9,319,268 B2 | 4/2016 | Allan et al. | |
| 9,344,323 B2 | 5/2016 | Civil et al. | |
| 9,401,817 B2 | 7/2016 | Holness et al. | |
| 9,473,983 B1 * | 10/2016 | Gerdes | H04L 27/00 |
| 9,781,048 B2 | 10/2017 | Holness et al. | |
| 9,860,164 B2 | 1/2018 | Jilani et al. | |
| 9,893,937 B2 | 2/2018 | Holness et al. | |
| 9,960,993 B2 | 5/2018 | Hu et al. | |
| 10,122,619 B2 * | 11/2018 | Holness | H04L 45/22 |
| 10,193,765 B2 | 1/2019 | Holness et al. | |
| 10,263,867 B2 | 4/2019 | Holness et al. | |
| 10,277,493 B2 | 4/2019 | Holness | |
| 10,291,509 B2 | 5/2019 | Holness | |
| 10,425,153 B2 | 9/2019 | Holness et al. | |
| 10,476,763 B2 | 11/2019 | Holness | |
| 10,834,110 B1 * | 11/2020 | Edelstein | H04L 67/2809 |
| 2005/0068950 A1 | 3/2005 | Ellis et al. | |
| 2005/0071453 A1 | 3/2005 | Ellis et al. | |
| 2005/0099949 A1 | 5/2005 | Mohan et al. | |
| 2005/0099951 A1 | 5/2005 | Mohan et al. | |
| 2005/0099954 A1 | 5/2005 | Mohan et al. | |
| 2005/0099955 A1 | 5/2005 | Mohan et al. | |
| 2007/0064700 A1 | 3/2007 | Holness | |
| 2007/0268817 A1 | 11/2007 | Smallegange et al. | |
| 2008/0175559 A1 * | 7/2008 | Jung | H04N 5/76 386/241 |
| 2010/0135291 A1 | 6/2010 | Martin et al. | |
| 2016/0182344 A1 | 6/2016 | Subhedar et al. | |
| 2016/0352570 A1 | 12/2016 | Holness | |
| 2017/0264565 A1 | 9/2017 | Gosselin-Harris et al. | |
| 2018/0294969 A1 | 10/2018 | Holness | |
| 2019/0245769 A1 | 8/2019 | Holness | |
| 2020/0296138 A1 * | 9/2020 | Crabtree | H04L 63/1441 |

OTHER PUBLICATIONS

Sajassi et al., BGP MPLS-Based Ethernet VPN, Internet Engineering Task Force (IETF), Standards Track, ISSN: 2070-1721, Feb. 2015, pp. 1-56.

Boutros et al., Virtual Private Wire Service Support in Ethernet VPN, Internet Engineering Task Force (IETF), Standards Track, ISSN: 2070-1721, Aug. 2017, pp. 1-17.

May 31, 2021 European Search Report issued for European Patent Application No. EP 21 15 3972.

\* cited by examiner

CONSTRAINT-BASED EVENT-DRIVEN TELEMETRY

TECHNICAL FIELD

The present disclosure generally relates to networking systems and methods. More particularly, the present disclosure relates to systems and methods for strategically streaming data in a telemetry system.

BACKGROUND

Generally, telemetry is a process by which measurements and other data are collected and recorded at remote or inaccessible locations, followed by the action of transmitting these measurements to receiving equipment where the measurements can be monitored. In a complex network application that may scale to extremely high capacities, the huge volume of data collected can overwhelm simple monitoring systems, such as Network Management Systems. For example, the amount of information generated by hundreds or even thousands of servers, databases, etc. may be difficult to handle in a meaningful way.

Some current event-driven telemetry mechanisms may allow data elements to be reported if/when the data elements change. In this sense, the mechanism for reporting data is very singular. In other alternative systems, data elements can be streamed from network elements to management systems all the time, which, as mentioned above, can overwhelm the management system when implemented on a large scale.

Currently, there are many limitations with known telemetry solutions, particularly in a telecommunications networking environment. One limitation is that many systems might not be able to reactively report bundled data elements based upon a potentially related but different data element set condition. Other systems, such as those that may stream all available data all the time, may suffer from the consequence of reporting too much information, whereby this reporting paradigm may result in expending more processing resources of network elements as would be necessary, even when there may not be a need for streaming such a large amount of data. In particular, streaming vast amounts of data by multiple network elements does not scale well in a large scale hierarchical network, where edge bandwidth and processing cycles are a precious resource that should not be wasted.

Therefore, there is a need in the field of telemetry to stream data to a monitoring system in a manner that more efficiently and intelligently relates to events, occurrences, and resources within a particular environment, such as within a multi-layer network.

BRIEF SUMMARY

The present disclosure is directed to systems and methods for performing constraint-based, event-driven telemetry, in networking. In one implementation, a network device may be configured to include a processing device and a memory device configured to store logic instructions which, when executed, may be configured to cause the processing device to obtain a first set of one or more data elements indicative of one or more conditions in a network in which the network device operates, monitor the first set of one or more data elements to determine if a predefined predicate is affirmed, and execute a response action when the predefined predicate is affirmed.

According to another embodiments, a network management system may include a processing device and a memory device configured to store logic instructions. When executed, the logic instructions may be configured to cause the processing device to gather one or more sets of one or more data elements streamed from one or more network devices in communication with the network management system. The one or more sets of one or more data elements may be indicative of one or more conditions of a network in which the one or more network devices operate. The instructions further cause the processing device to perform analytics on the one or more sets of one or more data elements and initiate one or more actions to modify the network in response to performing analytics.

According to yet another embodiment, a non-transitory computer-readable medium configured to store computer logic having instructions is provided. The instructions, when executed, are configured to cause one or more processing devices to obtain a first set of one or more data elements indicative of one or more conditions of a network, monitor the first set of one or more data elements to determine if a predefined predicate is affirmed, and execute a response action when the predefined predicate is affirmed.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
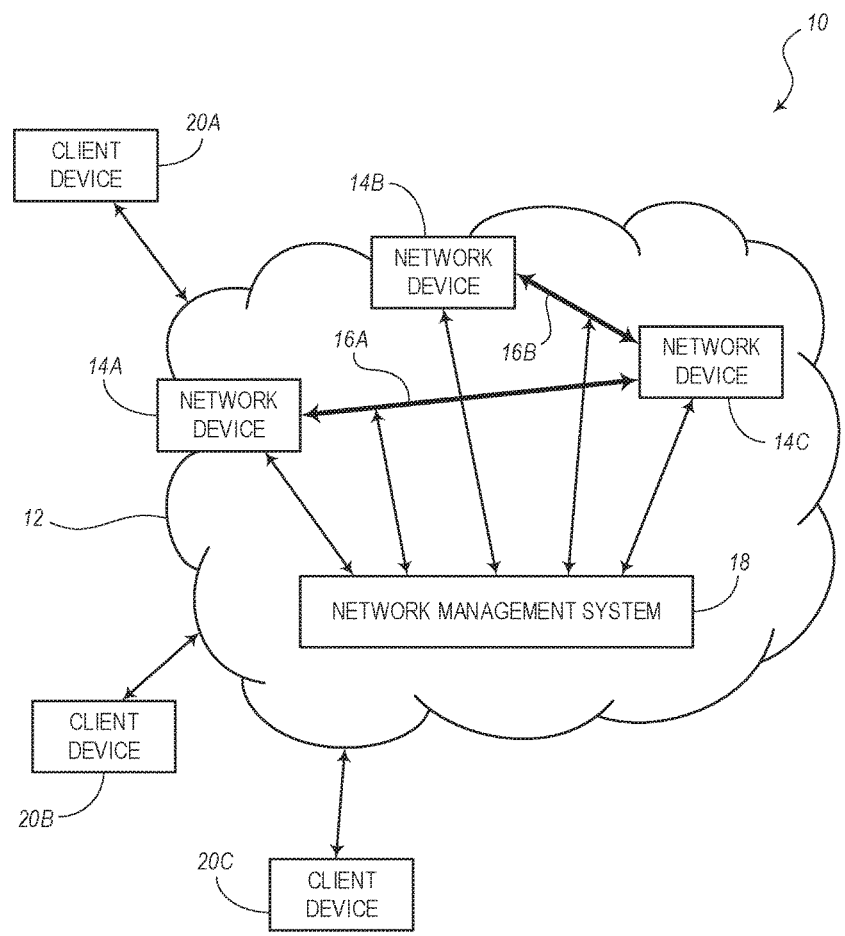
FIG. 1 is a schematic diagram of a communication system in which data can be monitored, according to various embodiments of the present disclosure.

The present disclosure relates to telemetry systems and methods where sets of data may be obtained at a plurality of locations throughout an environment (e.g., a network such as a packet network or the like). As is typical in a telemetry system, the data from the remote locations can be transmitted or streamed to a central monitoring system, where the data from the multiple devices can be analyzed. In some cases, the data may be transmitted when certain conditions are met, such as when a specific event takes place. Thus, the devices themselves may include analyzing components for determining if these events occur and may be configured to stream data to the monitoring system when one or more of these events does occur. According to the systems and methods of the present disclosure, a user can define a specific "predicate," such that, when the predicate is affirmed, data is streamed to the monitoring system for analysis.

A "predicate," as used in the present disclosure, may be something that is affirmed or denied about a subject. A predicate may be a statement or condition about a subject and may have a logical answer of true or false. The predicate may also be used to express affirmation, or, on the contrary, may express a negation, denial, or contradiction of the statement or condition about the subject. A predicate may include a mathematical equation, expression, or condition (e.g., using >, ≥, <, ≤, =, !=, ≠, etc.) and may include a determination as to whether or not that mathematical equation, expression, or condition is met. A predicate may include a proclamation, declaration, affirmation, or assertion of something about a subject related to a proposition or statement that expresses a condition or event. In some embodiments, the predicate may include one or more events that are analyzed to determine if data should be streamed.

Also, instead of merely telemetry streaming sets of data elements that are directly related to the conditions, events, or predicates being analyzed, the embodiments of the present disclosure may be configured to stream any set of one or more data elements, which may be directly related, indirectly related, partially related, and/or absolutely unrelated to the one or more data elements used in the determination of the predicate. As discussed in the present disclosure, the term "telemetry" may refer to the process of recording and transmitting the readings of an instrument or device from remote points (e.g., at network elements within a network) to receiving equipment that is configured to monitor the measurements.

The present disclosure relates to streaming telemetry data and provides an intelligent event-driven telemetric strategy. Telemetry streaming essentially is a process of quickly getting information within an environment (e.g., on a network) in a format that is easy to use. In many conventional telemetry systems, a "pull" model is used for data reporting. The pull model (e.g., Simple Network Monitoring Protocol (SNMP), Command Line Interface (CLI), Syslog, etc.) includes the process of collecting data in a way that has limitations that restrict automation and scale. In the pull model, the network elements may be configured to send data only when a client requests it. To initiate requests, continual intervention is required, which makes the pull model inefficient.

On the other hand, the systems and methods of the present disclosure may be configured to utilize a "push" model, which results in a significant efficiency gain over the conventional pull models. However, some push models may continuously stream information out of the network elements, which can overwhelm a management device. Therefore, the embodiments of the present disclosure are configured to use a push model that uses certain constraints so as not to overwhelm the management device. For example, in some cases, the present disclosure may enable a user to select predetermined events that can be monitored, such that, when it is determined that the event(s) take place, specific data may be streamed to the management device for analysis. Thus, with the constraint-based event-driven strategy, a network may be scaled without overwhelming a management device configured to receive the data. Also, according to other embodiments of the present disclosure, the management device may further be configured to perform certain analytics on the received data, which may result in further actions, such as modifying characteristics of the network as needed. Telemetry enables the push model, which provides near-real-time access to monitoring data.

In general, embodiments of the present disclosure provide systems, methods, and computer-readable media for monitoring a network in a scalable manner. In particular, state information from network functions (whether physical or virtual) may be retrieved as telemetric data streams. In some embodiments, the telemetric data streams may be triggered by Threshold Crossing Events (TCEs) at distinct points within the network element data path. When a TCE is raised, telemetric information starts to be collected until the TCE is cleared. A TCE may be raised as an indication or as a precursor of an abnormal/unexpected event occurring for service traffic flows within the network. Specifically, the TCEs introduce intelligence into data collection for monitoring the network. In some embodiments, the TCE-based telemetric data streams correlate to dynamic behavior of network traffic patterns, interactions of network elements, and system resource consumptions. Accordingly, the TCE-based telemetric data streams provide useful insights into the application behavior for meeting Service Level Agreements (SLAs) and for guiding future decisions on resource planning.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a schematic diagram illustrating an embodiment of a communication system 10 in which data can be monitored. In some embodiments, one or more of the components or elements shown in FIG. 1 may be omitted, repeated, and/or substituted in the communication system 10 as would be understood by one or ordinary skill in the art. Accordingly, embodiments of the present disclosure should not be limited to the specific arrangements of components or elements shown in FIG. 1.

In the illustrated embodiment, according to one example, the communication system 10 includes a network 12, which may include a number of network devices 14A, 14B, 14C connected by network paths 16A, 16B. In some embodiments, one or more of the network devices 14 may be edge devices. The communication system 10 may also include a network management system 18, which may be in communication with the network devices 14A, 14B, 14C and network paths 16A, 16B. It should be noted that the network management system 18 may be in communication with more or fewer network devices and links according to various implementations.

As described herein with respect to the communication system 10, one or more network devices (e.g., network devices 14A, 14B, 14C, etc.) may be configured to monitor themselves to determine operational conditions thereof. The network devices 14 can also monitor one or more paths (e.g., network paths 16A, 16B). Based on predefined criteria for analyzing the monitored conditions (or based on whether or not predefined predicates are affirmed), the network devices 14 may be configured to push specific information to the network management system 18, whereby this push information may be at least partially related to the respective devices or unrelated to the devices 14. Thus, the network management system 18 is configured to receive information from one or more network devices 14 (e.g., potentially hundreds of network devices). The network management system 18 may then be configured to analyze the information to determine if appropriate actions need to be taken within the network 12 in response to the state of the components within the network 12.

As shown in FIG. 1, the communication system 10 includes multiple client devices 20A, 20B, 20C connected by the network 12 in accordance with some embodiments. The network 12 may be a set of interconnected computing devices that are configured to receive and forward packets in order to transmit information from a source client device (e.g., client device 20A) to a destination client device (e.g., client device 20C). In some embodiments, the network 12 may be configured as a Local Area Network (LAN), a Wide Area Network (WAN), the Internet, a telecommunications network, etc., and may include wired and/or wireless components.

Although FIG. 1 shows three network devices 14A, 14B, 14C, two network paths 16A, 16B, and three client devices 20A, 20B, 20C, those of ordinary skill in the art, having the benefit of an understanding of the present disclosure, will appreciate that the communication system 10 may have any number of network devices 14, network paths 16, and client devices 20. Further, different network paths 16 may share one or more devices or connect different devices altogether.

In general, the network 12 provides network services to the client devices (e.g., client devices 20A, 20B, 20C, etc.). In particular, the network services may be provided by one or more service providers operating at least portions of the network 12 to provide services to one or more users of the client devices 20. For example, one or more client devices 20 may be configured to send data and/or receive data over the network 12. In some embodiments, the network services allow the client devices 20 to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices 20. The client devices 20 may be computing devices of any type (e.g., mobile phones, desktop computers, tablets, personal computers (PCs), routers, switches, servers, or other devices operated by the users).

Within the network 12, the network device 14A, 14B, 14C, etc. may be computing devices of any type (e.g., servers, routers, switches, etc.), operated by one or more service providers of the network 12. Each network device 14 may have one or more ports, which are physical and/or logical interfaces for communicating with other network devices.

Further, the network paths (e.g., network paths 16A, 16B, etc.) between any two adjacent or neighboring network devices may be a sequence of one or more network links, one or more intermediate elements, and/or any intervening devices that connect the two respective network devices. The network links 16 may be connections between two ports residing on two separate network devices (i.e., external link) or within a single network device (i.e., internal link). In some embodiments, each of the network devices 14 may be connected to one or more network paths 16. For example, as illustrated in FIG. 1, the network device 14A is connected to the network path 16A, the network device 14B is connected to the network path 16B, and the network device 14C is connected to network paths 16A and 16B. Thus, network devices 14A and 14C can communicate directly via network path 16A, and network devices 14B and 14C can communicate directly via network path 16B. In some embodiments, multiple network paths may exist between any two network devices. Accordingly, packets or other telecommunication data may be exchanged between the two network devices via one or more of the network paths.

In some embodiments, the network 12 may include multiple layers according to a layered network architecture, such as the seven-layer OSI model of computer networking. In such embodiments, the network paths 16 may include network links, intermediate elements, and/or any intervening devices that support or otherwise are associated with one or more network layers.

The network 12 has various networking components that have associated Operations, Administration, and Management (OAM) such as, for example, Dense Wavelength Division Multiplexing (DWDM), Optical Transport Network (OTN), Synchronous Optical Networking (SONET), Synchronous Digital Hierarchy (SDH), Ethernet, Multiprotocol Label Switching (MPLS), Internet Protocol (IP), etc. Today's traditional method of instrumenting network performance involves network elements collecting lots of raw data associated with simple OAM packets and bytes. The raw data can be uploaded at a coarse time interval (typically 15 minute bins) into a Network Management System (NMS) where it is organized according to a structured database and monitored for threshold crossing alarms. This approach is based on a narrow scope of cause and effect for each OAM mechanism. At Layer 0, with the introduction of coherent DWDM technology, the network 12 can have a suite of photonic data measured by the Digital Signal Processor (DSP) technology including, but is not limited to, information relating to the real time monitoring of pre-FEC Bit Error Ratio (BER), optical loss, optical propagation delay, and variations in power levels, optical amplifier gain, optical noise, optical signal to noise ratio, polarization and chromatic dispersion. At Layer 1, the network 12 can have access to a well-defined suite of OAM bytes defined by the ITU-T OTN standard (G.709) that include details of connection performance, continuity, connectivity and latency for end-to-end paths as well as individual links. At Layers 2 and 3, the network 12 can have access to packet OAM statistics defined by standards organizations like MEF, IEEE, ITU-T and IETF for Ethernet, MPLS and IP packet flows and tunnels. Currently, this OAM data is collected and monitored on a per-layer basis, it is directly associated with the layer service in question and it is monitored in pseudo real time.

The network management system 18 may include equipment enabling administration and management processes for the network 12. The network management system 18 may include many functions, such as network service provisioning, network monitoring, fault analysis, performance management, etc. In some embodiments, the network management system 18 may perform network monitoring functions to monitor the network 12. Some monitoring functions may include detecting slow or failing network device 14 or other components of the network 12 and notifying service provider(s) in case of outages or other service interruptions. In response to this notification, the network management system 18 may also perform one or more network management tasks to mitigate or otherwise address the outages and service interruptions. For example, the network management tasks may include fault analysis and performance management for maintaining quality of service of the network 12.

In some embodiments, the network management system 18 may be a dedicated device separate from the network devices 14 that transmits information between the client devices 20. In some embodiments, at least a portion of the network management system 18 may be distributed and reside within one or more of the network devices 14, which can transmit information between the client devices 20.

Figure 2:
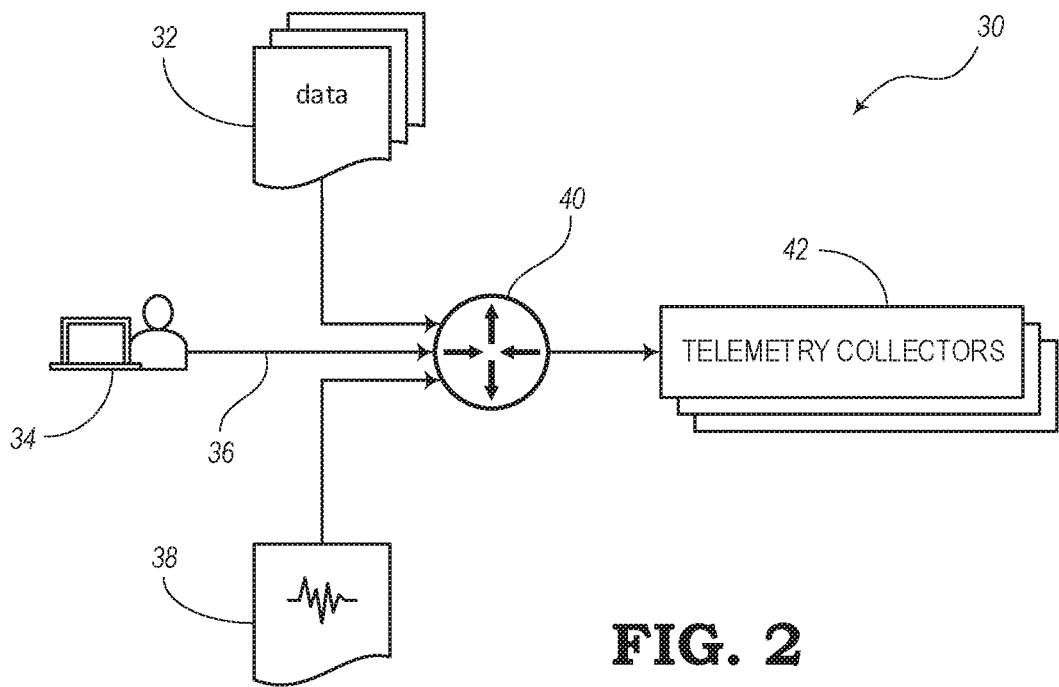
FIG. 2 is a schematic diagram showing the collection of telemetric data, according to various embodiments.

FIG. 2 is a schematic diagram illustrating an embodiment of a system 30 for the collection of telemetric data. The system 30 in this embodiment includes data 32, which may include, for example, a stream of time-series data, such as statistical data obtained and sent from one or more locations within a network (e.g., network 12). Also, an operator 34 (e.g., using a control device within the network) may be allowed to submit one or more requests 36 for information of the operational state of one or more various components in the network. Asynchronous information 38 may be reported from various components in the network for reporting events, such as when an interface or other network element changes states.

The data 32, user requests 36, and asynchronous information 38 is provided to a router 40 (or switch or other suitable network elements) within the network (e.g., network 12). The router 40 may be configured to receive the various data, requests, information, etc., from various sources for analysis to determine if this data, requests, information, etc. meets certain predetermined predicate criteria. If so, then the router 40 is configured to transmit instructions, which may include parameters of the data, requests, information, etc., to telemetry collectors 42. In some embodiments, the telemetry collectors 42 may be configured to receive the instructions (along with the parameters of the data, requests, information, etc.) to enact one or more actions in response to the status or condition of the network.

For example, as shown in FIG. 2, there may generally be three types of telemetry data streams. These three types of telemetry data may include a time-series data stream (i.e., data 32), an asynchronous reporting events stream (i.e., asynchronous data 38), and one or more operator requests 36 for ad-hoc information.

The process for streaming the time-series data 32 may include sending statistics of a network device 14, interface, or another network element at a one-second cadence. The asynchronous report 38, which may be a type of event-driven update, could be sent from a network device 14, network element, or interface only when the interface changes state (e.g., changes from up to down). The operator requests 36 could be based on an operator or user requesting operational state information from one or more interfaces.

By utilizing the push model of the present disclosure, it is possible to achieve some efficiency gains in the communications system 10. In this respect, the network elements (e.g., network devices 14) within the network 12 can be programmed to more intelligently push information. Although there may be times when it may be beneficial to push all available data from the network devices 14 continuously, the systems and methods of the present disclosure provide a more efficient strategy for streaming only in response to certain events and only within certain constraints.

Some of the predetermined events may be previously defined within a Service Provider's network. The detection of these events may be used as a trigger to start streaming real-time information. Also, the information that is streamed is not necessarily the same information that is analyzed to determine if a predetermined event has occurred or is not necessarily information directly related to this data for determining events. Instead, the streamed information may be not related or indirectly related to that information used for determining the events.

As an analogy in another field, if the oil pressure of a vehicle drops below a certain level, or if the engine temperature exceeds a designated level, this measured information could be used as an indication of a problem with the vehicle or a potential issue that may likely occur with the vehicle. To help diagnose a potential future problem (which may statistically become more probable due to the realization of certain threshold-crossing or other events), massive amounts of data may then be reported and collected, which will be much more useful when the first measurements and events are determined.

Conversely, such a massive amount of vehicle data could be persistently reported and collected at all times. Thus, the large amounts of data may be collected even when running conditions of the vehicle are optimal and the data is not as useful. Therefore, the system may unnecessarily utilize monitoring resources when the vehicle is running fine and when an imminent problem is statistically unlikely to occur.

The present disclosure expands upon the event-driven telemetry reporting mechanisms. A Remote Procedure Call (RPC) (e.g., gRPC) may have a Network Management Interface (NMI) (e.g., gNMI) specification, which is an example definition of the existing set of event-driven update methods. The embodiments of the present disclosure may introduce constraint-based, event-driven telemetry. A user may be allowed to select or create a definition of conditions associated with one or more data elements that must be met, before the reporting/streaming of singular or bundled data elements is activated. Sensors within the network 12 (e.g., associated with the network devices 14) may be capable of sensing various information and transmitters may then be capable of bulking various information/data paths together. This process may be able to minimize computing resources while maximizing throughput, since the bulk reporting computing tax is only realized when designated conditions are met.

Some embodiments may include event-driven telemetry schemes that allow the reporting of the data/information based upon change events associated with the data/information element or simply streaming. However, according to preferred embodiments, the present disclosure further provides the ability to trigger the streaming of a designated group/bundle of data/information elements (e.g., via xpath expressions) based upon the condition of a designated disparate data/information element. From a syntax representation perspective, this can be expressed as follows:

[xpath /x/y/z condition(P)] {stream xpath /p/d/q, . . . },
[xpath /x/y/z NOT condition(P)] {stop stream xpath /p/d/q, . . . }

The condition(P) function could represent:

an xpath [comparison] operator (e.g., >, <, =, ≥, ≤, !=, AND, OR, etc.), which allows comparison between the xpath express and the P expression.

an ON_CHANGE streaming mode subscription which is applied to the xpath expression.

The P value could be represented by {xpath /a/b/c condition(P), value (numeric/string/Boolean)}.

The present disclosure may include associative logic/semantics defining conditions for which one or more data elements can trigger the reporting of same or disparate, bundled or individual, data/information elements. For example, consider a typical network scenario where a network element has primary (e.g., /port/1/2) and backup (e.g., /port/1/4) interfaces that are used to support some sort of network resiliency. The intelligent event driven telemetric streaming concept being introduced by this invention can be used as follows:

[/port/1/2/OperState="DOWN"] {stream /port/1/4, /queue-group/1/4, /policer/1/4}

The net effect is that the network element may only start streaming information associated with the newly active path, when the primary path is inactive.

Another representative example could be to monitor throughput traffic associated with a queue and start streaming relevant information when usage exceeds a threshold. This could be represented by the intelligent event driven telemetric streaming concept as follows:

[/queue/0/throughput >75 Mbps] {stream/queue/stats, /port/stats}

The network management system 18 may further include or operate with network elements that include example details of a device (e.g., network devices 14) and transmit information between the client devices 20 depicted in FIG. 1. In some embodiments, one or more of the network devices 14 may include a first component having measurement values, threshold values, and threshold-crossing events. A second component of the network device(s) 14 may include a time-series. One or more of these modules and elements of the network devices may be omitted, repeated, and/or substituted.

The first components of the network devices 14 may be coupled to one or more ports (e.g., port 163). The first component may be a subset of the network device 14 configured to perform a specific function (e.g., input, output, switch, queue, monitor, etc.) in the processing network traffic received/transmitted by the network device 14. Each of these components may include a software component, a hardware component, or a combination thereof.

In some embodiments, each of the first components may be configured to generate measurement values (e.g., values A, B, C, etc.) of network traffic processed by the first component. The measurement values may be the result of measuring the network traffic directly. For example, the network traffic may include data packets or data frames received or sent via the port (e.g., port 163). A data frame is a sequence of data packets that includes a payload and associated control information. For example, the measurement value A may include a numeric value and/or a symbolic value (e.g., text or graphical symbol) resulting from measuring the data frames processed by the first component.

In some embodiments, the network traffic may be dynamic, and the measurement values may vary with time. A threshold-crossing event is an occurrence of the time-varying measurement values crossing over a threshold with respect to a predetermined criterion. A threshold is a predetermined numeric value and/or a symbolic value for comparison. For example, the predetermined criterion may specify the measurement value changing from being less than the threshold to being larger than the threshold. In another example, the predetermined criterion may specify the measurement value changing from being larger than the threshold to being less than the threshold. In yet another example, the predetermined criterion may specify the measurement value alternating within a time period and/or a set of number of times between being larger than the threshold and being less than the threshold.

According to some embodiments, the first component may be configured to evaluate the measurement values (e.g., measurement values A, B, C, etc.) with respect to predetermined criteria (e.g., based on a threshold A, threshold B, etc.) to detect corresponding threshold-crossing events (e.g., threshold-crossing event A, threshold-crossing event B, etc.). For example, the threshold-crossing event A may be detected when a measurement value (e.g., measurement value A exceeds the threshold A). In some embodiments, the threshold-crossing event A may include a record maintained by the first component of the network device 14 that describes the event of the measurement value A exceeding the threshold A. In addition, the record may also include context information, such as a time stamp or other attributes of the network traffic corresponding to when the threshold-crossing event A is detected.

In some embodiments, the thresholds A, B, etc. may be defined to provide hysteresis in detecting the threshold-crossing events. Hysteresis is the dependence of the state of a system on history. In other words, detecting the threshold-crossing events may be dependent on whether any other threshold-crossing event has previously been detected. For example, subsequent to a threshold-crossing event A, a threshold-crossing event B may be detected when the measurement value (e.g., measurement value B) becomes less than the threshold B. Further subsequent to the threshold-crossing event B, the threshold-crossing event A may be detected again when yet another measurement value exceeds the threshold A. In some embodiments, the threshold-crossing event B includes a record maintained by the first component of the network device 14 that describes the event of the measurement value B becomes less than the threshold B. In addition, the record may also include context information, such as a time stamp or other attributes of the network traffic corresponding to when the threshold-crossing event B is detected.

In some embodiments, threshold-crossing events may be detected at distinct points (e.g., one or more of network devices 14A, 14B, 14C, etc.) within the network 12. When a threshold-crossing event is detected, telemetric information starts to be collected until the event is cleared. In other words, the telemetric information is terminated when the predetermined criterion of the threshold-crossing event is no longer met. In some embodiments, a threshold-crossing event is an indication or a precursor of an abnormal/unexpected event occurring for network traffic flowing within the network 12. For example, a threshold-crossing event may correspond to an excess amount of traffic being policed/dropped, which may be an indication of an end user trying to transmit too much information into the network 12. In another example, a threshold-crossing event may correspond to forwarding table entries, associated with a given MAC address, switching back and forth between ports indicating a loop within the network 12. In yet another example, a threshold-crossing event may correspond to queue fill rates exceeding a certain threshold, which may indicate a network congestion, which may lead to packet dropping. In still another example, a threshold-crossing event may correspond to data packets being dropped at a queue due to encountering a Weighted Random Early Detection (WRED) curve. In still another example, a threshold-crossing event may correspond to excessive Access Control List (ACL) denies, which may indicate a rogue device trying to access the network 12.

The first component of the network device 14, as described above, may further be configured to initiate, in response to threshold-crossing event (e.g., threshold-crossing event A), each of the first and second components of the network device 14 to generate a time-series of measurement values of the network traffic processed by the respective component. A time-series is a series of data points indexed in time order. For example, a time-series may include a sequence of measurement values taken at successive equally spaced points in time (e.g., measurement value C) and subsequent measurement values generated by the first component. The measurement value C and subsequent measurement values form a time-series of the component A that may be initiated in response to the threshold-crossing event A. Similarly, the time-series may include measurement values generated by the second component that may also be initiated in response to the threshold-crossing event A. In some embodiments, multiple time-series elements generated by the first and second components of the network device 14 may be aggregated into a telemetric data stream that is sent by the network device 14 to the network management system 18, as shown in FIG. 1. In some embodiments, the network management system 18 may be configured to analyze the telemetric data stream to extract meaningful statistics and/or other characteristics of the data for detecting anomalies, such as slow or failing devices in the network 12.

As noted above, subsequent to the threshold-crossing event A, the first component of the network device 14 may detect the threshold-crossing event B when the measurement value (e.g., measurement value B) becomes less than the threshold B. In some embodiments, the first component may be further configured to terminate, in response to threshold-crossing event B, the time-series generated by the first and second components of the network device 14. Accordingly, the telemetric data stream may be terminated in response to threshold-crossing event B.

Figure 3:
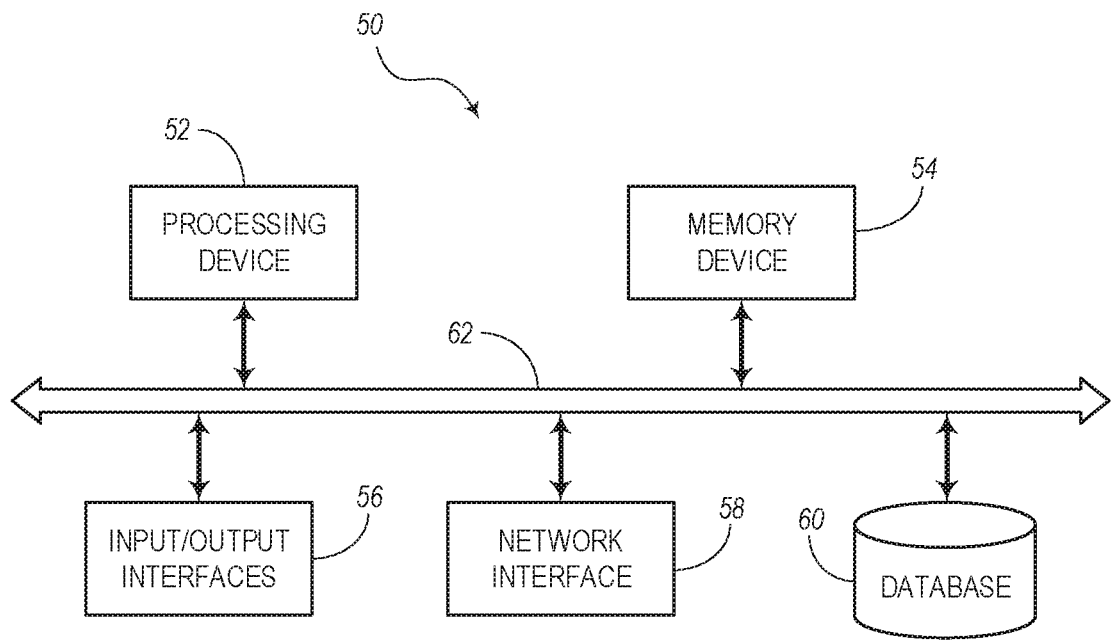
FIG. 3 is a block diagram of a computer system representing the network management system or one or more of the network devices shown in FIG. 1, according to various embodiments of the present disclosure.

FIG. 3 is a block diagram illustrating an embodiment of a computer system 50. In some embodiments, the computer system 50 may represent the network management system 18 and/or one or more of the network devices 14 shown in FIG. 1. The computer system 50 may be configured for enabling the monitoring and collection of network data, conditions, and status. From this collected information, it is determined whether or not a predicate is detected. As mentioned above, a "predicate" may be a condition or expression that may be affirmed or denied as being true. If it is determined that the predicate is affirmed (e.g., true), the computer system 50 is configured to stream data to the telemetry collector 42, which, according to various embodiments of the present disclosure, may be the network management system 18.

In the illustrated embodiment, the computer system 50 may be a digital computer that, in terms of hardware architecture, generally includes a processing device 52, a memory device 54, input/output (I/O) interfaces 56, and a network interface 58. The memory device 54 may include a data store, database, or the like. It should be appreciated by those of ordinary skill in the art that FIG. 2 depicts the computer system 50 in a simplified manner, where practical embodiments may include additional components and suitably configured processing logic to support known or conventional operating features that are not described in detail herein. The components (i.e., 52, 54, 56, 58, 60) are communicatively coupled via a local interface 62. The local interface 62 may be, for example, but not limited to, one or more buses or other wired or wireless connections. The local interface 62 may have additional elements, which are omitted for simplicity, such as controllers, buffers, caches, drivers, repeaters, receivers, among other elements, to enable communications. Further, the local interface 62 may include address, control, and/or data connections to enable appropriate communications among the components 52, 54, 56, 58, 60.

The processing device 52 is a hardware device adapted for at least executing software instructions. The processing device 52 may be any custom made or commercially available processor, a central processing unit (CPU), an auxiliary processor among several processors associated with the computer system 50, a semiconductor-based microprocessor (in the form of a microchip or chip set), or generally any device for executing software instructions. When the computer system 50 is in operation, the processing device 52 may be configured to execute software stored within the memory device 54, to communicate data to and from the memory device 54, and to generally control operations of the computer system 50 pursuant to the software instructions.

It will be appreciated that some embodiments of the processing device 52 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 52 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 56 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 56 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 58 may be used to enable the computer system 50 to communicate over a network, such as the network 12 shown in FIG. 1, the Internet, a wide area network (WAN), a local area network (LAN), and the like. The network interface 58 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 58 may include address, control, and/or data connections to enable appropriate communications on the network 12.

The memory device 54 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 54 may incorporate electronic, magnetic, optical, and/or other types of storage media. The memory device 54 may have a distributed architecture, where various components are situated remotely from one another, but can be accessed by the processing device 52. The software in memory device 54 may include one or more software programs, each of which may include an ordered listing of executable instructions for implementing logical functions. The software in the memory device 54 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 54 may include a data store used to store data. In one example, the data store may be located internal to the computer system 50 and may include, for example, an internal hard drive connected to the local interface 62 in the computer system 50. Additionally, in another embodiment, the data store may be located external to the computer system 50 and may include, for example, an external hard drive connected to the I/O interfaces 56 (e.g., SCSI or USB connection). In a further embodiment, the data store may be connected to the computer system 50 through a network and may include, for example, a network attached file server.

Moreover, some embodiments may include a non-transitory computer-readable storage medium having computer readable code stored in the memory device 54 for programming the computer system 50 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 52 that, in response to such execution, cause the processing device 52 to perform a set of operations, steps, methods, processes, algorithms, functions, techniques, etc. as described herein for the various embodiments.

In particular, the memory device 54 may include a number of services, computer programs, sub-routines, software modules, instructions, computing logic units, etc. for enabling the processing device 52 to perform various functions associated with the streaming of telemetry data. With respect to the network management system 18, a first group of logic instruction modules may be included in the memory device 54 for defining specific functionality of the network management system 18 with respect to receiving data streams from multiple network devices 14 and storing the data in order that analytics can be applied to the data streams. Also, with respect to the network management system 18, the memory device 54 may be configured to store logic instructions for enabling a user (e.g., network operator) to pre-establish certain definition of predicates and criteria for determining if one or more predicates are affirmed, enabling the user to pre-establish definitions of response actions that may be taken if the predicates are affirmed, and enabling the user to pre-establish definitions of how the network 12 may be modified in response to analytics of streamed data from the multiple network devices 14.

In addition, with respect to the memory device 54 being defined with respect to one or more of the network devices 14, a second group of logic instruction modules may be included in the memory device 54 for defining specific functionality of the network devices 14. Particularly, the logic modules for the network devices 14 may include functionality for monitoring the respective network devices 14 to determine if certain criteria are met or if the pre-established predicates are affirmed. If so, the logic modules may further enable the network devices 14 to stream a specific set of one or more data elements to the network management system 18.

Figure 4:
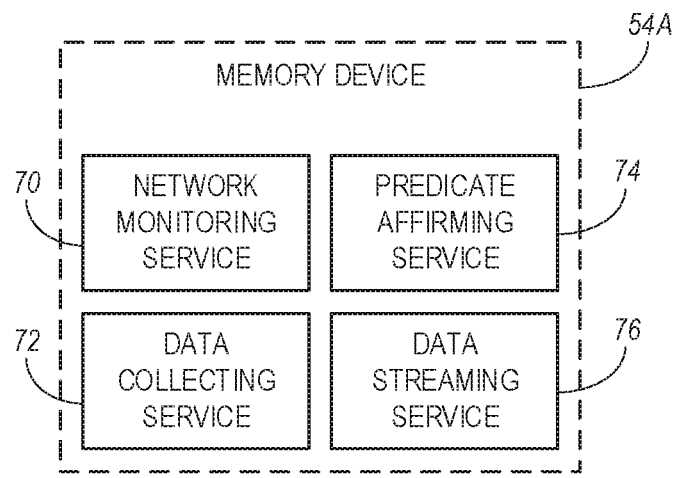
FIG. 4 is a block diagram showing the memory device of one or more of the network devices shown in FIG. 1, according to various embodiments.

FIG. 4 is a block diagram illustrating a memory device 54A of the computer system 50 of FIG. 3 when the computer system 50 represents one of the network devices 14. Thus, the memory device 54A may be incorporated into the computer system 50 as the memory device 54. As shown, the memory device 54A may include logic modules or services, as described above, for enabling the respective network device 14 to perform various functionality with respect to constraint-based, event-driven telemetry. In the illustrated embodiment, the memory device 54A includes a network monitoring service 70, a data collecting service 72, a predicate affirming service 74, and a data streaming service 76. Some or all of each of the services 70, 72, 74, 76 may be combined into one module or service, may be omitted, or may be combined with other services for performing various functions related to the processes of streaming telemetry data.

The functionality of the telemetric streaming processes may have a performance objective of working to get as much data off the network devices 14 as quickly as possible. In some embodiments, full access may be granted to the network management system 18 to cover at least a portion of the network 12 so as to receive operational data from one or more network devices 14 and/or paths 16. Another aspect of the present disclosure is that the network 12 may be configured with automation to allow the network management system 18 to automatically receive information from the network devices 14 and/or paths 16. The network management system 18 may serialize the data in a flexible, efficient way that fits customer automation tools.

The network monitoring service 70 may be configured to monitor data of the respective network device itself or to monitor data of a link or channel connected to the respective network device. The network monitoring service 70 may be capable of monitoring any suitable aspect of the network that may indicate how the various network elements may be operating. The data collecting service 84 may be configured to collect the data (e.g., from a time series) of the monitored data. This collected data can be analyzed by the predicate affirming service 74 to determine whether or not a predicate (or condition or state) meets certain criteria to affirm if the predicate is true or false. If the predicate is true, then certain response actions can be taken. For example, according to some embodiments, the response actions may include streaming data. As such, the data streaming service 76 may be configured to stream data to the network management system 18. The streamed data may be related, unrelated, or indirectly related to the data collected by the data collecting service 72 for affirming the predicate.

Therefore, in some case, the memory device 54A may be configured to obtain network data associated with a first set of one or more data elements X, determine if/when a predicate (or condition) based on the first set of one or more data elements X is affirmed, and then stream a second set of one or more data elements Y when the predicate is affirmed. The first and second sets of one or more data elements X, Y may be completely unrelated or may share some common elements or may be indirectly related in any way.

Figure 5:
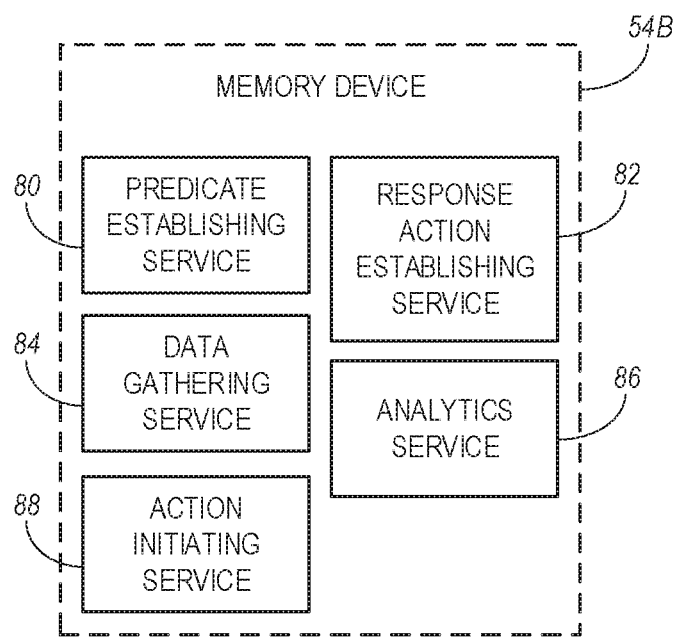
FIG. 5 is a block diagram showing the memory device of the network management system shown in FIG. 1, according to various embodiments.

FIG. 5 is a block diagram illustrating a memory device 54B of a network management system 18 according to an embodiment in which the computer system 50 represents the network management system 18. In this embodiment, the memory device 54B may include a predicate establishing service 80, a response action establishing service 82, a data gathering service 84, an analytics service 86, and an action initiating service 88. Some or all of each of the services 80, 82, 84, 86, 88 may be combined into one module or service, may be omitted, or may be combined with other services for performing various functions related to the processes of streaming telemetry data.

The predicate establishing service 80 and response action establishing service 82 may be considered as preliminary process modules that may be utilized before a network is monitored. For example, a network operator may be allowed to enter information to establish how each of one or more predicates is defined by using the predicate establishing service 80. Also, the network operator may be allowed to enter information to establish what types of response actions are to be performed when the predicates (e.g., established in the service 80) are affirmed or detected. In particular, the response actions may be related to what data elements are to be streamed to the network management system 18 when the predicates are affirmed. The predicates and response actions may be selected from a list of available option, depending on the network environment. In some embodiments, the network operator may be allowed to create predicates and/or response actions from scratch without any preconceived hints or selectable options. Once the network operator establishes predicates and response actions, the network can be monitored, whereby the data collected of the network states can be compared with or analyzed against the predicates to determine if certain response actions (e.g., streaming telemetry data) should be taken.

The data gathering service 84 of the memory device 54B is configured to receive the data that is streamed from one or more network devices 14. These sets of streamed one or more data elements may be stored in memory or in a database (e.g., database 60). The analytics service 86 may be configured to analyze the gathered data to determine if the network 12 is in a state that should be modified. If so, the action initiating service 88 may be configured to cause one or more network elements (e.g., the network management system 18 itself, one or more of the network devices 14, or other suitable network element) to make modification within the network 12 to allow the network 12 to operate more efficiently and/or to avoid faults or congestion therein. It should be noted that the actions of the action initiating service 88 may be different than the response actions associated with the data streaming service 76.

FIGS. 6-10 are flow diagrams illustrating various methods, processes, and functions of various devices of the communication system 10. Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 6:
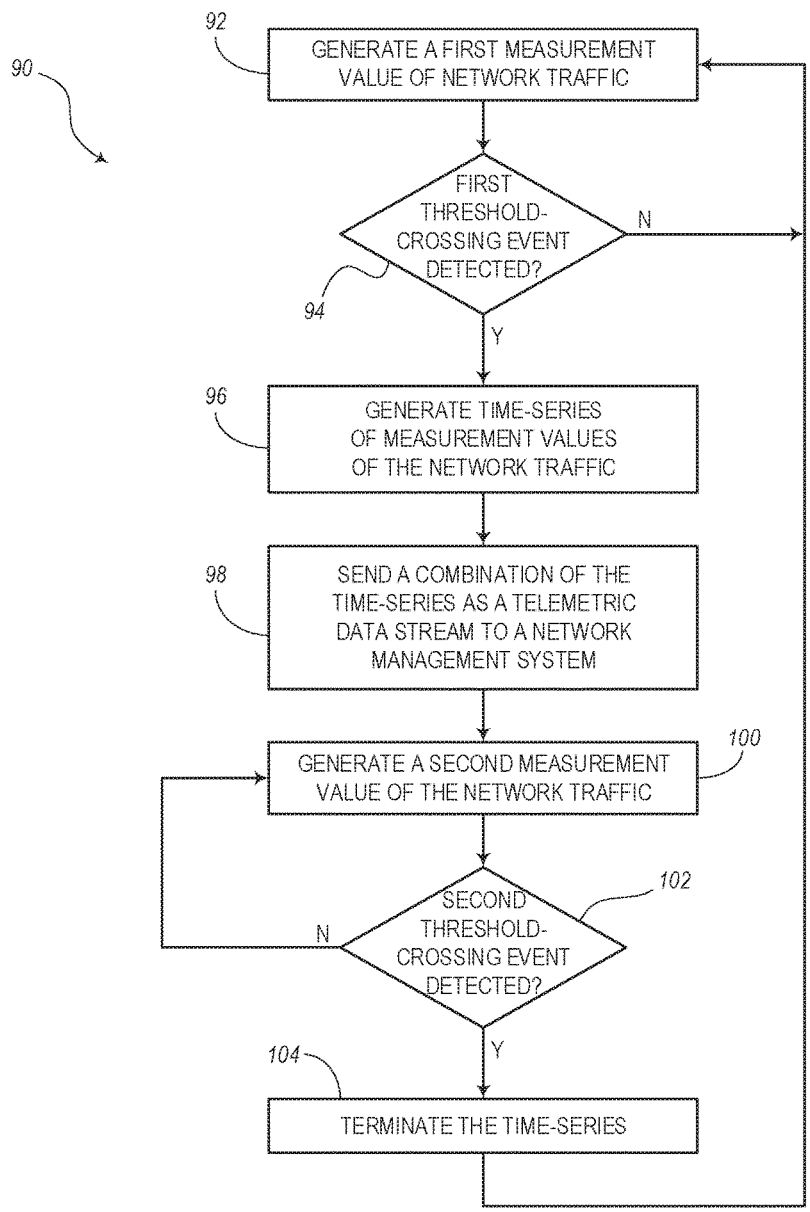
FIG. 6 is a flow diagram showing a method that may be executed by one or more of the network devices shown in FIG. 1, according to various embodiments.

FIG. 6 is a flow diagram illustrating an embodiment of a method 90 that may be performed by one or more of the network devices 14 shown in FIG. 1. In some embodiments, the method 90 may include the step of generating a first measurement value of the network traffic, as indicated in block 92. Initially, the first measurement value of the network traffic may be processed by one or more components of the respective network device 14. For example, the components may include a classifier component, a metering component, a switching component, a queuing component, etc.

The method 90 also includes the step of determining if a first threshold-crossing event has been detected, as indicated in decision diamond 94. In some embodiments, the first threshold-crossing event may be detected based on the first measurement value meeting a first pre-determined criterion. For example, the first threshold-crossing event may be detected based on the first measurement value exceeding a first pre-determined threshold. In some embodiments, the determination is made by the particular element of the network device that generates the first measurement value. If the first threshold-crossing event is not detected, the method 90 returns back to block 92. However, if the first threshold-crossing event is detected, the method 90 proceeds to block 96.

Block 96 describes the step of generating a time-series of measurement values of the network traffic. In particular, each time-series may be generated in response to the first threshold-crossing event. In some embodiments, each particular component detects the threshold crossing-event and generates a time-series based on data frames processed by the particular component.

The method 90 also includes sending a combination of the time-series as a telemetric data stream to a network management system, as indicated in block 98. In some embodiments, the number of time-series are aggregated to form the telemetric data stream. For example, different time-series may be aggregated based on time stamps of the measurement values, based on individual components, or based on other criteria.

Also, the method 90 includes the step of generating a second measurement value of the network traffic, as indicated in block 100. In particular, the second measurement value may be generated by the component concurrently with the network device sending the telemetric data stream. In other words, the second measurement value may be generated in a time span during which the time-series elements are sent as the telemetric data stream.

The method 90 also includes determining if a second threshold-crossing event has been detected, as indicated in decision diamond 102. In some embodiments, the second threshold-crossing event may be detected based on the second measurement value meeting a second pre-determined criterion. For example, the second threshold-crossing event may be detected based on the second measurement value being less than a second pre-determined threshold. In some embodiments, the second pre-determined threshold may be the same as the first pre-determined threshold. In other embodiments, the second pre-determined threshold may be different from the first pre-determined threshold.

If the determining in decision diamond 102 is negative, the method 90 returns back to block 100. However, if the second threshold-crossing event has been detected, the method proceeds to block 104, which indicates that the time-series is terminated. The number of time-series data points generated by the components of the network device may be terminated in response to the second threshold-crossing event. Accordingly, the telemetric data stream is terminated, and the method returns to block 92.

The method 90 may be executed, for example, by one or more components discussed above. One or more steps shown in FIG. 6 may be omitted, repeated, and/or performed in a different order based on different embodiments of the present disclosure. Accordingly, the illustrated embodiment should not be considered limited to the specific steps and arrangement thereof shown in FIG. 6.

In some embodiments, the second measurement value and the first measurement value may correspond to measurements of the same network parameter performed at different time points. In other embodiments, the second measurement value and the first measurement value may correspond to measurements of the different network parameters performed at different time points. In some embodiments, the second measurement value and the first measurement value may correspond to measurements generated by the same component of the network. In other embodiments, the second measurement value and the first measurement value may correspond to measurements generated by different components of the network.

Figure 7:
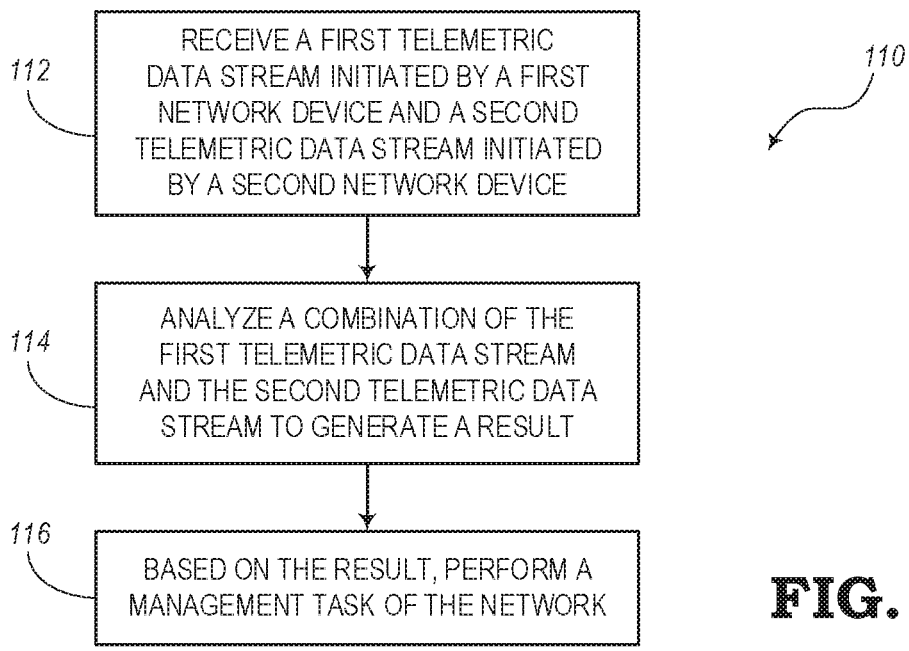
FIG. 7 is a flow diagram showing a method that may be executed by the network management system shown in FIG. 1, according to various embodiments.

FIG. 7 is a flow diagram illustrating an embodiment of a method 110 that may be executed by the network management system 18 shown in FIG. 1. The method 110 of FIG. 7 may be executed, for example, by one or more components discussed above with reference to FIGS. 1-3 and may be based on the method 90 described with reference to FIG. 6. One or more steps shown in FIG. 7 may be omitted, repeated, and/or performed in a different order among different embodiments of the present disclosure. Accordingly, embodiments of the present disclosure should not be considered limited to the specific number and arrangement of steps shown in FIG. 7.

The method 110 includes the step of receiving a first telemetric data stream initiated by a first network device and a second telemetric data stream initiated by a second network device, as indicated by block 112. In some embodiments, the first network device and second network device may be part of a network path of the network. In some embodiments, the first telemetric data stream and the second telemetric data stream may be sent by the first network device and second network device, respectively, using the method described with reference to FIG. 6 above.

As described with respect to block 114, the method 110 includes the step of analyzing a combination of the first telemetric data stream and the second telemetric data stream. The first and second telemetric data streams may be analyzed by the network management system 18 to generate a specific result. For example, the result may predict or otherwise indicate slow or failing network devices, outages, or other service interruptions of the network 12, etc. When the first network device and second network device (from block 112) are part of a network path (e.g., one of the paths 16), the result may be used to perform a path-level diagnostic. The path-level diagnostic may be an analysis of the result to identify a slow or failing portion of the network path, outages, or other service interruptions of the network path, etc. The method 110 further includes the step, as described in block 116, of performing a management task of the network based on the result. For example, a preventive measure or other maintenance tasks may be performed to address an issue of the network 12.

Figure 8:
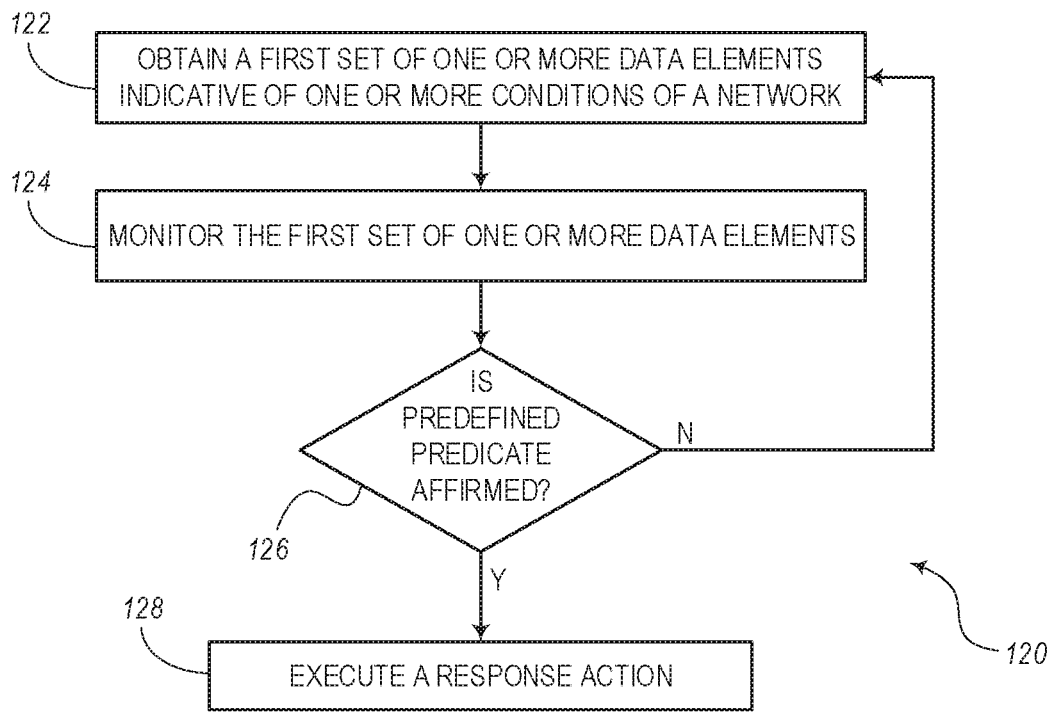
FIG. 8 is a flow diagram showing a preferred method executed by one or more of the network devices shown in FIG. 1, according to various embodiments.

FIG. 8 is a flow diagram showing an embodiment of a preferred method 120 that may be executed by one or more of the network devices 14 shown in FIG. 1. The method 120 includes obtaining a first set of one or more data elements indicative of one or more conditions of a network, as indicated in block 122. The method 120 further includes the step of monitoring the first set of one or more data elements, as indicated in block 124, and then determining if a predefined predicate is affirmed, as determined in decision diamond 126. If the predicate is not affirmed, the method 120 returns to block 122. However, if the predicate is indeed affirmed, then the method 120 proceeds to block 128, which indicates that the step of executing a response action is performed. As mentioned above, the response action may include streaming a second set of one or more data elements, which may be related or unrelated to the first set of one or more data elements.

Figure 9:
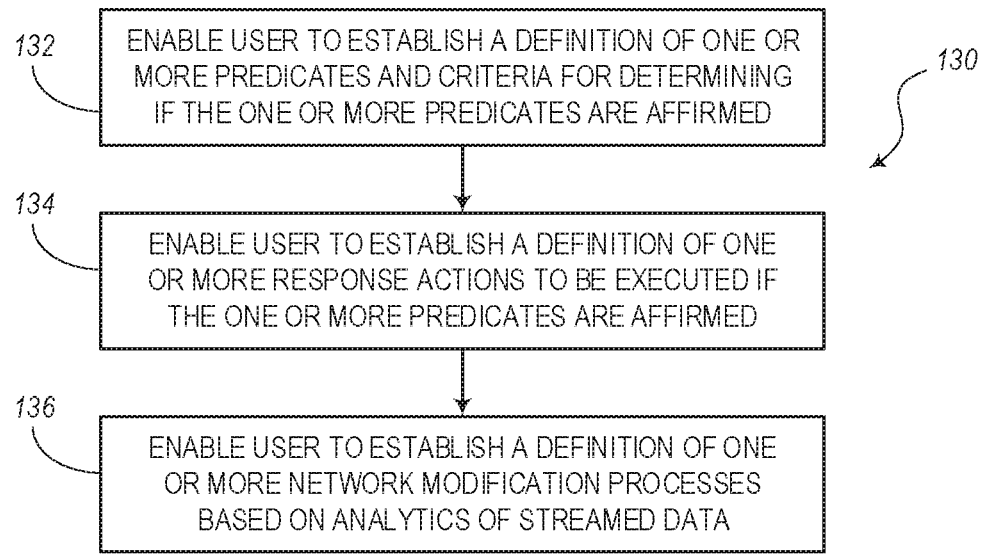
FIG. 9 is a flow diagram showing a preferred preliminary method executed by the network management system shown in FIG. 1, according to various embodiments.
Figure 10:
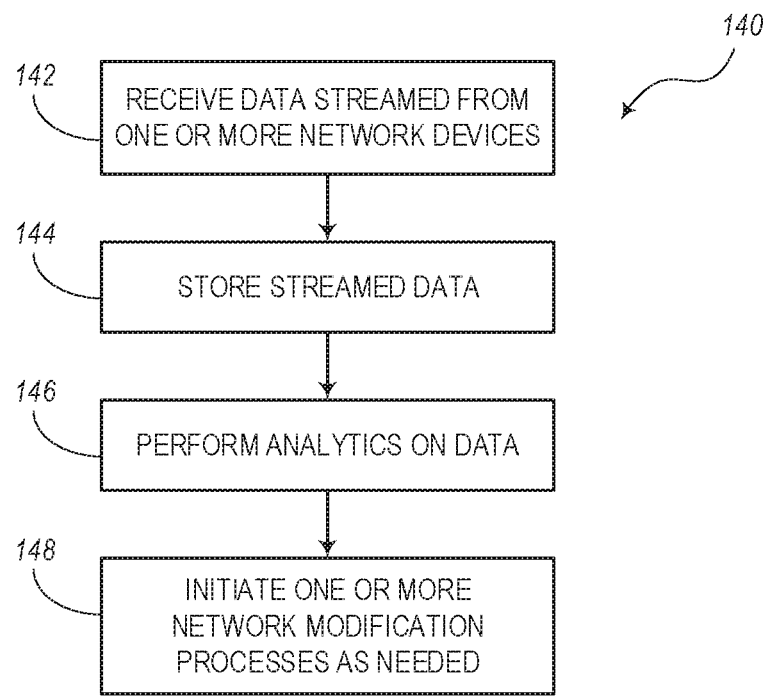
FIG. 10 is a flow diagram showing a preferred method executed by the network management system shown in FIG. 1, according to various embodiments.

FIGS. 9 and 10 are related to processes that may be performed by the network management system 18. For example, the method 130 shown in FIG. 9 represents preliminary steps that may be executed to enable a user to establish the criteria for evaluation. The method 140 of FIG. 10 represents the steps that may be executed during the actual process of in-situ network monitoring.

FIG. 9 is a flow diagram illustrating an embodiment of a preferred method 130 executed by the network management system 18. The method 130 includes enabling a user to establish a definition of one or more predicates and criteria for determining if the one or more predicates are affirmed, as indicated in block 132. The method 130 also includes enabling a user to establish a definition of one or more response actions to be executed if the one or more predicates are affirmed, as indicated in block 134. Also, the method 130 includes enabling a user to establish a definition of one or more network modification processes based on analytics of streamed data received from the network elements throughout the network 12. The user mentioned in each step 132, 134, 136 may be one or more network operators and may be the same person or different people.

FIG. 10 is a flow diagram illustrating an embodiment of a preferred method 140 executed by the network management system 18. The method 140 includes the step of receiving data that is streamed from one or more network devices, as indicated in block 142. The method 140 also includes storing the received streamed data, as indicated in block 144. The method 140 also includes the step of performing analytics on the data, as indicated in block 146. Based on the analytics, the method 148 includes initiating one or more network modification processes as needed. The network modification processes may be performed by the network management system 18 itself or may be performed by any suitable network element in the network 12 (e.g., one or more of the network devices 14).

Figure 11:
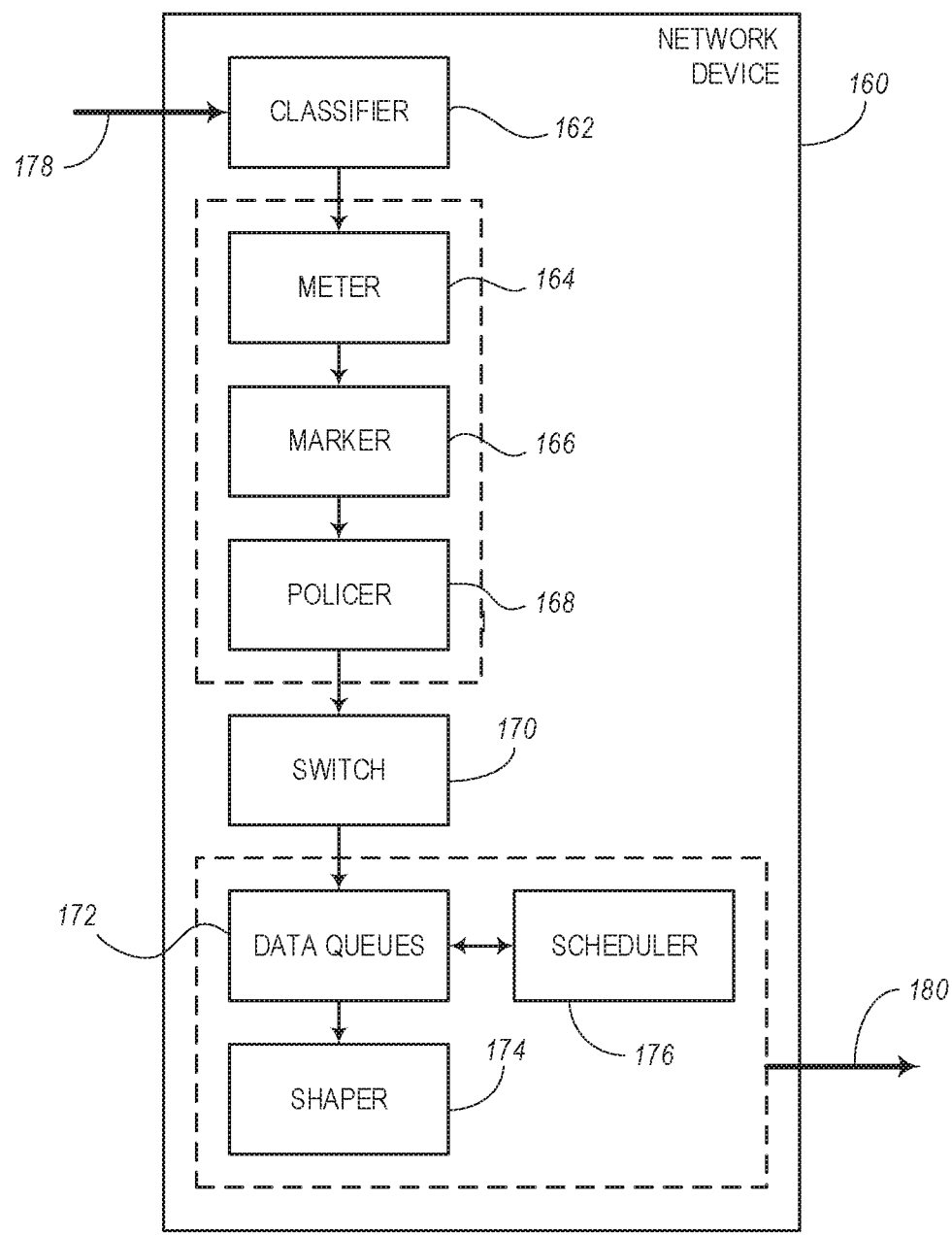
FIG. 11 is a block diagram showing one or more of the network devices shown in FIG. 1, according to various embodiments.

FIG. 11 is a block diagram showing an embodiment of a network device 160 (e.g., one or more of the network devices 14 shown in FIG. 1). In some embodiments, the network device 160 includes a classifier 162, a meter 164, a marker 166, a policer 168, a switch 170, data queues 172, a shaper 174, and a scheduler 176, forming a data path of the network device 160. The components of the network device 160 collectively process network traffic. The network device 160 receives ingress data frames 178 and transmits corresponding egress data frames 180. In other words, the ingress data frames 178 pass through the data path and are classified, metered, marked, policed, switched, queued, shaped, and scheduled in various intermediate forms to become the egress data frames 180. Each of the components (i.e., components 162, 164, 166, 168, 170, 172, 174, 176) performs one or more specific functions of the network device 160.

In addition, a component may generate a particular threshold-crossing event (TCE) based on the particular intermediate form of data frames processed by the component. In some embodiments, one or more of the modules and elements shown in FIG. 11 may be omitted, repeated, and/or substituted. Accordingly, embodiments of the present disclosure should not be limited to the specific arrangements of modules shown in FIG. 11.

As noted above, the specific TCE generated by each component of the network device 160 may be used to predict when anomalies may occur within the network, thus triggering the collection and streaming of telemetric data. The ability of each component of the network device 160 to start and stop collection and streaming of telemetric data based upon TCEs provides a mechanism to select data of interest from the network device 160. Accordingly, the telemetric data is transmitted in a structured format to a remote network management system (e.g., network management system 18) for monitoring. Utilization of the TCEs provides intelligence into monitoring data collection strategies. In other words, monitoring data is only streamed from the network device 160 if an individual component detects that something unusual is about to happen. In this manner, the telemetric data stream provides near-real-time access to the monitoring data. The monitoring data is continuously streamed out of each component for the network management system to act on.

For example, the network device 160 may be a network switch or router that classifies the ingress data frames 178 to take an action based upon the classification. The classifier 162 identifies the ingress data frames 178 using certain information found within the frame/packet to determine whether the incoming traffic is authorized based on an access control list (ACL). Non-authorized traffic is denied access and excessive ACL denials may be an indication of a rogue device trying to access the network 12 via the network device 160. In this example, the TCE may be generated by the classifier 162 upon detecting that an ACL denial statistic exceeds a preset threshold. If this TCE is detected, the classifier 162 identifies a flow signature associated with the ACL denials and initiates time-series data collection based on the flow signature. For example, each of the classifier 162, meter 164, marker 166, policer 168, switch 170, data queues 172, shaper 174, and scheduler 176 performs periodic measurements when processing data frames associated with the flow signature. Each component generates a result that is a time-series of measurement values. The time-series of all components are then aggregated to be sent to the network management system (e.g., network management system 18) as the telemetric data stream.

In another example, the meter 164 may be a component that measures rate and burst size of network traffic from a client to the network device 160. The marker 164 may be a component that encodes a "color" on the frame (or packet). A "color" may be either green, yellow, or red, wherein "Green" may indicate that traffic is within a profile (i.e., within a client contract and considered committed/guaranteed delivery). "Yellow" may indicate that the traffic is outside of profile (i.e., considered best effort delivery). "Red" may indicate excessive violation of the profile such that the traffic is be dropped without delivery through the network 12. The policer 168 may be a component that prevents "red" frames from entering the network 12. Excessive amounts of traffic that triggers alerts of the marker 166 or policer 168 may be an indication of an end user attempting to transmit too much information into the network 12. In this example, the TCE may be generated by the meter 164, marker 166, or policer 168 upon detecting that a measure of the traffic alerts (e.g., amount of traffic being policed or dropped) exceeds a preset threshold. If this TCE is detected, the classifier 162 can identify a service associated with the traffic alerts and initiate a time-series data collection based on the service. For example, each of the classifier 162, meter 164, marker 166, policer 168, switch 170, data queues 172, shaper 174, and scheduler 176 performs periodic measurements when processing data frames associated with the service. Each component may generate a result that is a time-series of measurement values. The time-series of all components are then aggregated to be sent to the network management system as the telemetric data stream.

In yet another example, the switch 170 may be a component that performs switching (e.g., forwarding, routing) functions within the network device 160. In other words, the switch 170 selects the egress port to which the frame/packet is dispatched, based on address information of the frame/packet. Various tables may be used by the switch 170 to perform such switching function. Port flapping (i.e., switching back and forth between ports) that may be found in forwarding table entries associated with a particular MAC address may be an indication of a loop within the network 12. In this example, the TCE may be generated by the switch 170 upon detecting that a measure of the port flapping exceeds a preset threshold. If this TCE is detected, the switch 170 identifies the flow causing the port-flapping and initiates time-series data collection based on flow. For example, each of the classifier 162, meter 164, marker 166, policer 168, switch 170, data queues 172, shaper 174, and scheduler 176 performs periodic measurements when processing data frames associated with the flow. Each component may generate a result that is a time-series of measurement values. The time-series of all components may then be aggregated in order that they can be sent to the network management system 18 as the telemetric data stream.

In addition to the forwarding table, the switch 170 may detect another TCE based on other table entries approaching the limit of the preset table size. If this TCE is detected, the switch 170 initiates time-series data collection based along the data path. For example, each of the classifier 162, meter 164, marker 166, policer 168, switch 170, data queues 172, shaper 174, and scheduler 176 performs periodic measurements when processing data frames along the data path. Each component generates a result that is a time-series of measurement values. The time-series of all components are then aggregated to be sent to the network management system as the telemetric data stream.

In still another example, the data queues 172, shaper 174, and scheduler 176 are components that buffer and schedule data packets to be dispatched out an egress port 180. Queue fill rates exceeding a preset threshold is an indication of network congestion and occurs prior to a queue tail drop scenario. In this example, the TCE may be generated the data queues 172, shaper 174, or scheduler 176 upon detecting that one or more queue fill rates exceed a preset threshold. Alternatively, the TCE may be generated when packets are being dropped at a queue due to encountering a Weighted Random Early Detection (WRED) curve. If this TCE is detected, the data queues 172, shaper 174, or scheduler 176 identifies the flow causing the network congestion and initiates time-series data collection based on flow. For example, each of the classifier 162, meter 164, marker 166, policer 168, switch 170, data queues 172, shaper 174, and scheduler 176 performs periodic measurements when processing data frames associated with the flow. Each component generates a result that is a time-series of measurement values. The time-series of all components are then aggregated to be sent to the network management system as the telemetric data stream. Additional TCEs may also be based upon CPU utilization and/or memory utilization. This may be particularly useful for virtual network functions, as well as physical network functions.

The systems and method of the present disclosure may utilize a "constraint predicate," which may be defined as a predetermined condition, limitation, or constraint of an environment being monitored, whereby this condition, limitation, or constraint is monitored to affirm whether or not it meets predetermined criteria. The predetermined criteria may include a true/false mathematical expression for monitoring whether a certain condition is met. When the predetermined criteria are affirmed, determined to be true, or meets some specific definition or characteristic, then the systems and methods of the present disclosure are configured to take one or more specific actions in response to the affirmation. In particular, the actions may include starting one or more data streams of a first set of one or more data elements and/or stopping one or more data streams of a second set of one or more data elements.

In some embodiments, the preferred embodiments of the present disclosure do not tie a predicate to any specific condition, such as threshold-crossings or time constraints. Instead, the predicate may include any general condition or constraint. Although threshold-crossing may be one condition, as mentioned in the present disclosure, it should be understood that the systems and methods of the present disclosure may include any general type of telemetry system for streaming among any network elements or systems.

One key aspect of telemetric streaming in the present disclosure is the way in which information is sent. With any network element, it may be best to push the data (e.g., from the network devices 14 to the network management system 18). The network management system 18 may then receive and store this information and then perform analytics on the information. This process may be referred to as a "push" model. Using a push model for data telemetry may be a much more efficient way to transport information to the network management system 18. Some or all of the data from each of the network devices 14 may be compressed to minimize the amount of bandwidth that is consumed when this information is transmitted.

From a broad network scaling perspective, it is better if the network devices 14 push the data (information) to the network management system 18, as opposed to the network management system 18 using a "pull" model of requesting data from the network devices to obtain the information. The value of this push process is that, compared to the pull model where the network management system 18 has to periodically request this information, there is less processing demands on the network management system 18 (e.g., having to request information from hundreds or thousands of network element sources). The push model cuts these extra steps out of the equation and reduces the processing overhead of the network management system 18.

From the point of view of a network device 14 operating within the "pull" scheme, the network device would need to continually look to see if a request for information is being made by the network management system 18. Then, it has to take the time to analyze the requests to determine what the requestor wants. Once it is determined what is being requested, the network device 14 must then take the time to retrieve the information. Therefore, from the perspective of the network device 14, it is more efficient when the network device 14 can automatically send data (when it has some) to the network management system 18.

Nevertheless, the network management system 18 may still receive an overwhelming amount of information from a plurality of network devices 14, particularly if the network 12 include hundreds or thousands of network devices 14. Thus, the embodiments of the present disclosure expand on the concept of determining one condition (e.g., threshold crossings) to include any condition or constraint that a network operator may want to monitor. By using a "constraint-based" system, the network 12 may be operated in a way that avoid a large portion of the work that would normally be devoted to unnecessary telemetry streaming. That is, instead of streaming everything, the systems and methods of the present disclosure are configured to use predetermined conditions, limitations, or constraints for limiting the amount of data that is sent to the network management system 18. The threshold-crossing constraint can be viewed as a specific condition that might be indicative of what is happening on the stream itself and then streaming the data. However, in addition to this scheme, the systems and methods of the present disclosure may use further processing to stream any selected stream of data, even if there is a condition or constraint on another stream of data.

An important aspect to the present disclosure is answering how to make the network element (e.g., network device 14) smarter when it comes to pushing huge amounts of data to the network management system 18 for analysis. One solution is to augment the network device 14 to allow it to monitor itself in order to have a good idea of itself and its operating conditions. If the network device 14 sees a condition that may warrant concern, then it can send all the data associated with this condition to the analytic engine (e.g., network management system 18). With this information, the network management system 18 can analyze the information just in case something goes wrong in the network 12 so that the reason for the failure can be determined.

The "constraint-based" aspect of the systems and methods may include a relational type of analysis. Based upon a first set of one or more data elements at one part of the network 12, the network management system 18 can operate within some predefined constraints (e.g., provided by the network operator) or some other type of parameters or characteristics of some relationship. With this information, the network management system 18 can figure out the status of the network 12 and determine if certain actions are needed.

One example of network conditions may include determining if queues of a network element are full, which may be indicative of a congestion issue. These particular queues, for instance, may be monitored in some cases if the network operator determines that the filling of these queues may be defined as a constraint that is worthy of consideration and when full may be indicative of something in the network going wrong. In this case, the network element (e.g., one of the network devices 14) may be configured to send a set of one or more data elements across its entire data path, in order that the network management system 18 can diagnose a problem in the network 12 to determine how this could occur.

In some embodiments, the systems and methods may be configured to correlate different sets of related or unrelated features and bring them all together with common semantics in order to produce some correlation between the predicates (e.g., mathematical expressions) and general actions. The predicate expression could be generic to allow some expressions to be combined together to produce some correlation among seemingly disparate features. In this way, a network operator may be able to form a chain between different statistics as part of the network element subscription and produce a more meaningful and intelligent set of data from the network elements based on the predicate or the expression of the particular iterations.

The predicate should not be viewed as being completely constrained. The present systems may make a generic predicate that could include any number of terms. There may be no specific constraints or restrictions on the predicate or what may be included in the predicate. Instead, in some cases, the predicate may include any feature or condition that can be measured as true or false. When there are state changes, the present systems may take action on other data streams, which is an important aspect of the present disclosure. Another key aspect is that the embodiments may be configured to enable a network operator or other user to configure how the sets of one or more data elements are gathered, analyzed, streamed, etc. Thus, the present disclosure enables a user-configurable system. In other words, the systems and methods may not be able to determine the best way to respond to certain conditions within a network, particularly as a network may change and/or scale over time. Thus, by enabling the network operator to establish how the various network conditions may be monitored, how constraint may be defined, what data streams to send for further analysis, how to respond when certain events occur, etc., the systems and methods of the present disclosure may be extremely flexible. Instead, the present disclosure provides the framework for enabling the establishment and definition of events, constraints, etc. to respond to various situations that may arise. In some embodiments, the present systems may include sets of predetermined predicates that may be used in many network environments, but also allows the modification of these predicates as needed. The present disclosure may provide a layout that may be easy for a network operator to select certain features for defining the predicates, select certain features for defining actions to be taken when the predicates are affirmed, among other selectable features. The layout may also provide facilities to allow the users to come up with their own constraints and responses. The term "predicate" may be viewed as a mathematical concept, but may also be viewed as a combination of a set of events.

According to some embodiments, the present disclosure may be directed to a process that includes determining if one or more events occur. Based on the occurrence of one or more of the events, which may be associated with a first set of one or more data elements X, the process may include triggering the reporting of a second set of one or more data elements Y, whereby data elements X and Y may be disparate data elements.

With the examples described herein, there may be relational aspects that are key. In one example, there may be conditions where: if some very specific event occurs in a set of one or more data elements X, then send the set of one or more data elements X, which may be similar to the threshold-crossing scenario described in the present disclosure. However, according to other aspects of the present disclosure, the embodiments may include relational aspects. For example, if there is a condition or constraint associated with some aspect of the set of one or more data elements X, then it may be predefined that the network device 14 sends another set of one or more data elements Y to the network management system 18. In other embodiments, if some constraints are determined in multiple sets of one or more data elements A, B, C, then the network device 14 may be configured to send all or parts of other sets of one or more data elements D, E to the network management system 18.

Therefore, it may not necessarily be one constraint or condition that is monitored, but it may be multiple constraints and may be any arbitrary set of conditions (related, unrelated, or indirectly related) that may be monitored. These are the predicate detection part of the processes, which includes determining if one or more sets of conditions become true. The present disclosure also describes an action response portion, such that the network device 14 may start streaming data sets A, B, C, and/or stop streaming data sets X, Y, and Z, or start streaming data set X and stop streaming data set Y. The predicate part may be very generic and can include streaming states and does not have to be related to streams only, but rather can be any arbitrary set of things. The action part may involve some set of changes in the streaming state. The conditions may be one or more specific events, and the actions may be streaming processes for one or more data sets, directly or indirectly related to the event(s).

One example of the embodiments of the present disclosure may include utility in the network environment. For instance, there may be a primary path failure and a backup path passes through a different port. When that situation happens, the network 12 may start streaming data associated with the new port through which the backup path passes. The event is on one port and the action may be to stream sets of data associated with something different in the network element. This might also include the action of stopping the transmission of data on the failed port. The network may start streaming session while stopping some other streaming session (or any other combination of stream starting and stopping processes). The trigger for the events could be one or more of a number of situations. Also, the actions could be one or more of a number of responses. In the primary path failure scenario, some actions may include starting/stopping transmission on unrelated ports or other parts of the network elements.

Some of the predicates that may be monitored may include the use of simple binary comparators. By comparing two data elements (using mathematical functions of $>$, $<$, $=$, etc.) or other simple expressions, certain predicates or constraints can be monitored. If an event happens in data set X, then one solution may be to stream data set Y, which may be disparate in the network element.

In another example of the network 12, there may be a port X that is monitored. In response to seeing changes in the state of port X, the systems and methods may include stopping of any streaming actions of data set X from port X and starting new streaming actions of data set Y from new port Y. This may be a basic example that captures some key concepts of the present disclosure in a simple manner. In some other examples, there may be the notion of utilizing compound predicates.

The embodiments of the systems and methods of the present disclosure are directed to telemetry streaming strategies that do not exist in conventional systems. For example, the present embodiments include the action of providing constraints by which events can be used to initiate or terminate the reporting (e.g., streaming) of telemetric information in a singular or bundled data element fashion. Also, the present embodiments are configured to provide recursive operator comparators between disparate data elements to define the constraints under which an event condition is realized. Furthermore, the present embodiments are configured for utilization of an event associated with data elements (X) to trigger the reporting (e.g., streaming) of bundled data elements (Y). The present embodiments also provide reporting (e.g., streaming) of data elements associated with Object {X, Y, Z} that may be initiated based upon a constraint (or condition) supplied by the Service Provider placed upon data elements associated with Object {A, [B, C]}.

As a result of incorporating the systems and methods of the present disclosure into a communication network, several benefits may be achieved. One benefit may include the ability to use the system as a differentiator for network platforms that support telemetric streaming. The present systems and methods may also allow low powered devices to participate at scale in streaming telemetric data. Also, the present disclosure facilitates the adoption of large network applications (e.g., 5G cell-site) of related access platforms that can more intelligently participate in streaming large amounts of telemetric data.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A network device comprising a processing device, and a memory device configured to store logic instructions which, when executed, are configured to cause the processing device to obtain a first set of one or more data elements indicative of one or more conditions in a network in which the network device operates, monitor the first set of one or more data elements to determine if a predefined predicate is affirmed, and execute a response action when the predefined predicate is affirmed, wherein the response action includes one or more of i) starting of streaming a second set of one or more data elements to a network management system and ii) ceasing the streaming of a third set of one or more data elements to the network management system.

2. The network device of claim 1, wherein the second set of one or more data elements is at least partially disparate from the first set of one or more data elements.

3. The network device of claim 1, wherein the predefined predicate and the response action are established by a user of a network management system configured to receive the second set of one or more data elements.

4. The network device of claim 1, wherein the first set of one or more data elements includes performance monitoring data.

5. The network device of claim 1, wherein the predefined predicate includes multiple predetermined conditions in the network.

6. A network management system comprising: a processing device, and a memory device configured to store logic instructions which, when executed, are configured to cause the processing device to configure one or more network devices in communication with the network management system to gather one or more sets of one or more data elements, the one or more sets of one or more data elements being indicative of one or more conditions in a network in which the one or more network devices operate, configure the one or more network devices to perform analytics on the one or more sets of one or more data elements, enable a user to establish a predicate corresponding to a condition of each of the one more sets of one or more data elements for the one or more network devices, enable the user to establish a response action to be executed when the predicate is affirmed, wherein the response action includes starting of streaming a first set of one or more data elements that is disparate from another set of one or more data elements used to determine if the predicate is affirmed, and initiate one or more actions to modify the network in response to performing analytics based on any of the first set one or more data elements streamed from the one or more network elements.

7. The network management system of claim 6, wherein the first set of one or more data elements are received from the one or more network devices in response to the predicate being affirmed by the one or more network devices.

8. The network management system of claim 6, wherein the response action includes ceasing the streaming of third set of one or more data elements.

9. The network management system of claim 6, wherein the predicate includes multiple predetermined conditions in the network.

10. A network management system comprising: a processing device, and a memory device configured to store logic instructions which, when executed, are configured to cause the processing device to configure one or more network devices in communication with the network management system to gather one or more sets of one or more data elements, the one or more sets of one or more data elements being indicative of one or more conditions in a network in which the one or more network devices operate, configure the one or more network devices to perform analytics on the one or more sets of one or more data elements, enable a user to establish a predicate corresponding to a condition of each of the one or more sets of one or more data elements for the one or more network devices, enable the user to establish a response action to be executed when the predicate is affirmed, wherein the response action includes one or more of i) starting of streaming of a first set of one or more data elements and ii) ceasing the streaming of a second set of one or more data elements, and initiate one or more actions to modify the network in response to performing analytics based on any of the first set one or more data elements streamed from the one or more network elements.

11. The network management system of claim 10, wherein the first set of one or more data elements are received from the one or more network devices in response to the predicate being affirmed by the one or more network devices.

12. The network management system of claim 10, wherein the response action includes streaming the first set of one or more data elements that is disparate from another set of one or more data elements used to determine if the predicate is affirmed.

13. The network management system of claim 10, wherein the predicate includes multiple predetermined conditions in the network.

* * * * *